United States Patent
Sweet

(10) Patent No.: US 12,043,180 B2
(45) Date of Patent: *Jul. 23, 2024

(54) HEAD UP SIDE VIEW MIRROR

(71) Applicant: Panasonic Automotive Systems Company of America, Peachtree City, GA (US)

(72) Inventor: Benjamin David Sweet, West Bloomfield, MI (US)

(73) Assignee: Panasonic Automotive Systems Company of America, Peachtree City, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/195,289

(22) Filed: May 9, 2023

(65) Prior Publication Data

US 2023/0271554 A1 Aug. 31, 2023

Related U.S. Application Data

(63) Continuation of application No. 17/452,374, filed on Oct. 26, 2021, now Pat. No. 11,679,720, which is a
(Continued)

(51) Int. Cl.
*B60R 1/12* (2006.01)
*B60K 35/00* (2006.01)
(Continued)

(52) U.S. Cl.
CPC ............... *B60R 1/12* (2013.01); *B60K 35/00* (2013.01); *B60R 1/26* (2022.01); *H04N 7/18* (2013.01); *H04N 23/90* (2023.01); *B60K 35/213* (2024.01); *B60K 35/28* (2024.01); *B60K 35/60* (2024.01); *B60K 2360/173*
(2024.01); *B60K 2360/21* (2024.01); *B60K 2360/31* (2024.01); *B60K 2360/334* (2024.01); *B60K 2360/777* (2024.01); *B60K 2360/797* (2024.01);
(Continued)

(58) Field of Classification Search
CPC ..... B60R 1/12; B60R 1/00; B60R 2001/1253; B60R 2300/105; B60R 2300/205; B60R 2300/303; B60R 2300/8046; B60R 2300/8066; B60K 35/00; B60K 2370/155; B60K 2370/173; B60K 2370/21; B60K 2370/31; B60K 2370/334; B60K 2370/777; B60K 2370/797; H04N 5/247; H04N 7/18
USPC .......................................................... 348/148
See application file for complete search history.

(56) References Cited

U.S. PATENT DOCUMENTS 7,502,048 B2 * 3/2009 Okamoto ............... H04N 7/181
382/104
10,501,018 B2 * 12/2019 Sweet ...................... H04N 7/18
(Continued)

*Primary Examiner* — Tung T Vo
(74) *Attorney, Agent, or Firm* — Laurence S. Roach, Esq.

(57) ABSTRACT

A motor vehicle includes a left side view camera attached to the left lateral side of the body and having a field of view in a rearward direction. A right side view camera is attached to the right lateral side of the body and has a field of view in a rearward direction. There is a right back up camera and a left back up camera. An optics module receives resulting video signals and produces light fields such that the light fields are reflected off of windows of the motor vehicle and are then visible to a driver of the motor vehicle as virtual images.

20 Claims, 5 Drawing Sheets

Related U.S. Application Data continuation of application No. 16/669,905, filed on Oct. 31, 2019, now Pat. No. 11,186,225, which is a continuation of application No. 15/652,567, filed on Jul. 18, 2017, now Pat. No. 10,501,018.

(60) Provisional application No. 62/363,558, filed on Jul. 18, 2016.

(51) Int. Cl.
  *B60R 1/26* (2022.01)
  *H04N 7/18* (2006.01)
  *H04N 23/90* (2023.01)
  *B60K 35/21* (2024.01)
  *B60K 35/28* (2024.01)
  *B60K 35/60* (2024.01)

(52) U.S. Cl.
  CPC . *B60R 2001/1253* (2013.01); *B60R 2300/105* (2013.01); *B60R 2300/205* (2013.01); *B60R 2300/303* (2013.01); *B60R 2300/8046* (2013.01); *B60R 2300/8066* (2013.01)

(56) References Cited

U.S. PATENT DOCUMENTS

| | | | |
|---|---|---|---|
| 11,186,225 B2* | 11/2021 | Sweet | B60R 1/00 |
| 2003/0021490 A1* | 1/2003 | Okamoto | H04N 7/181 |
| | | | 348/E7.086 |
| 2008/0122597 A1* | 5/2008 | Englander | B60R 1/00 |
| | | | 348/E7.086 |
| 2010/0220189 A1* | 9/2010 | Yanagi | B60R 1/00 |
| | | | 348/148 |
| 2010/0245577 A1* | 9/2010 | Yamamoto | B60R 1/00 |
| | | | 348/148 |
| 2010/0302019 A1* | 12/2010 | Birkemeyer | B60R 1/00 |
| | | | 340/425.5 |
| 2017/0043719 A1* | 2/2017 | Wippler | H04N 7/181 |
| 2019/0202355 A1* | 7/2019 | Tatara | B60S 1/56 |

* cited by examiner

HEAD UP SIDE VIEW MIRROR

CROSS-REFERENCED TO RELATED APPLICATIONS

This application is a continuation of U.S. patent application Ser. No. 17/452,374, filed on Oct. 26, 2021, which is currently under allowance, and which is a continuation of U.S. patent application Ser. No. 16/669,905, filed on Oct. 31, 2019, Now U.S. Pat. No. 11,186,225, Issued on Nov. 20, 2021, and which is a continuation of U.S. patent application Ser. No. 15/652,567, filed on Jul. 18, 2017, which is Now U.S. Pat. No. 10,501,018, Issued on Dec. 10, 2019, which claims benefit of U.S. Provisional Application No. 62/363,558 filed on Jul. 18, 2016, the disclosures of which are hereby incorporated by reference in their entireties for all purposes.

FIELD OF THE INVENTION

The disclosure relates to a head up display (HUD) in a motor vehicle.

BACKGROUND OF THE INVENTION

A head up display emits light that reflects from the front windshield to be seen by the driver. The light appears to come from a virtual image in front of the driver and in front of the windshield. This type of head up display is currently commercially available.

Conventional head up displays create the virtual image by first using a display to create an image. Next, the light from the image is reflected from one or more mirrors. Next, the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

Vehicles include side view mirrors which protrude from the side of the vehicle and which can impact things or be impacted by things, causing damage to the mirrors and/or to the things that the mirrors impact or are impacted by. The side view mirrors also produce wind-drag when the vehicle is moving, which has a deleterious effect on fuel economy.

SUMMARY

The present invention may include a replacement for traditional physical side-view mirrors in a vehicle. The present invention may provide a low-profile rearward-looking camera. A head up display may project a virtual image onto a window. More particularly, a "mirror" display is provided in the form of a virtual head-up display projected in the same space that the traditional physical mirror would have occupied.

The virtual head-up display can also be used to project alternate images. For example, when the vehicle is backing out of a parking space, the side-view head-up display can show images captured by cameras in the rear of the vehicle looking out laterally from the vehicle. These images may show traffic approaching the vehicle from the left or right which is not yet visible to the driver with the naked eye, as the driver's view is blocked by vehicles on either side as the driver backs out of the parking space.

The invention may include an object to project the image onto if the window is rolled down. A small stationary window segment may be provided near the front of the door, similar to the classic "wind wing" triangular vent window.

In one embodiment, the invention comprises a motor vehicle including a body having a left lateral side and an opposing right lateral side. A left side view camera is attached to the left lateral side of the body and has a field of view in a rearward direction. A right side view camera is attached to the right lateral side of the body and has a field of view in a rearward direction. A left back up camera is attached to the left lateral side of the body and has a field of view in a left lateral direction. A right back up camera is attached to the right lateral side of the body and has a field of view in a right lateral direction. An electronic processor receives images captured by each of the left side view camera, right side view camera, left back up camera, and right back up camera. A left video signal is transmitted based on the images captured by the left side view camera and the left back up camera. A right video signal is transmitted based on the images captured by the right side view camera and the right back up camera. A left optics module receives the left video signal from the electronic processor and produces a left light field such that the left light field is reflected off of a left side window of the motor vehicle and is then visible to a driver of the motor vehicle as a first virtual image. The left light field is based on the left video signal. A right optics module receives the right video signal from the electronic processor and produces a right light field such that the right light field is reflected off of a right side window of the motor vehicle and is then visible to the driver as a second virtual image. The right light field is based on the right video signal.

In another embodiment, the invention comprises a display method for a motor vehicle, including attaching a left side view camera to a left lateral side of a body of the motor vehicle such that the left side view camera has a field of view in a rearward direction. A right side view camera is attached to a right lateral side of the body such that the right side view camera has a field of view in a rearward direction. A left back up camera is attached to the left lateral side of the body such that the left back up camera has a field of view in a left lateral direction. A right back up camera is attached to the right lateral side of the body such that the right back up camera has a field of view in a right lateral direction substantially opposite to the left lateral direction. Images captured by each of the left side view camera, right side view camera, left back up camera, and right back up camera are received. A left video signal based on the images captured by the left side view camera and the left back up camera is transmitted. A right video signal based on the images captured by the right side view camera and the right back up camera is transmitted. A left light field is produced such that the left light field is reflected off of a left side window of the motor vehicle and is then visible to a driver of the motor vehicle as a first virtual image. The left light field is based on the left video signal. A right light field is produced such that the right light field is reflected off of a right side window of the motor vehicle and is then visible to the driver as a second virtual image. The right light field is based on the right video signal.

In yet another embodiment, the invention comprises a motor vehicle including a body having a left lateral side and an opposing right lateral side. A left side view camera is attached to the left lateral side of the body and has a field of view in a rearward direction. A right side view camera is attached to the right lateral side of the body and has a field of view in a rearward direction. An electronic processor receives images captured by each of the left side view camera and right side view camera. The electronic processor transmits a left video signal based on the images captured by the left side view camera, and transmits a right video signal based on the images captured by the right side view camera. A left optics module receives the left video signal from the electronic processor and produces a left light field such that the left light field is reflected off of a left side window of the motor vehicle and is then visible to a driver of the motor vehicle as a first virtual image. The left light field is based on the left video signal. A right optics module receives the right video signal from the electronic processor and produces a right light field such that the right light field is reflected off of a right side window of the motor vehicle and is then visible to the driver as a second virtual image. The right light field is based on the right video signal.

An advantage of the present invention is that it may eliminate the physical mirrors, thereby reducing the vehicle profile, and thereby reducing the wind drag of the vehicle.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
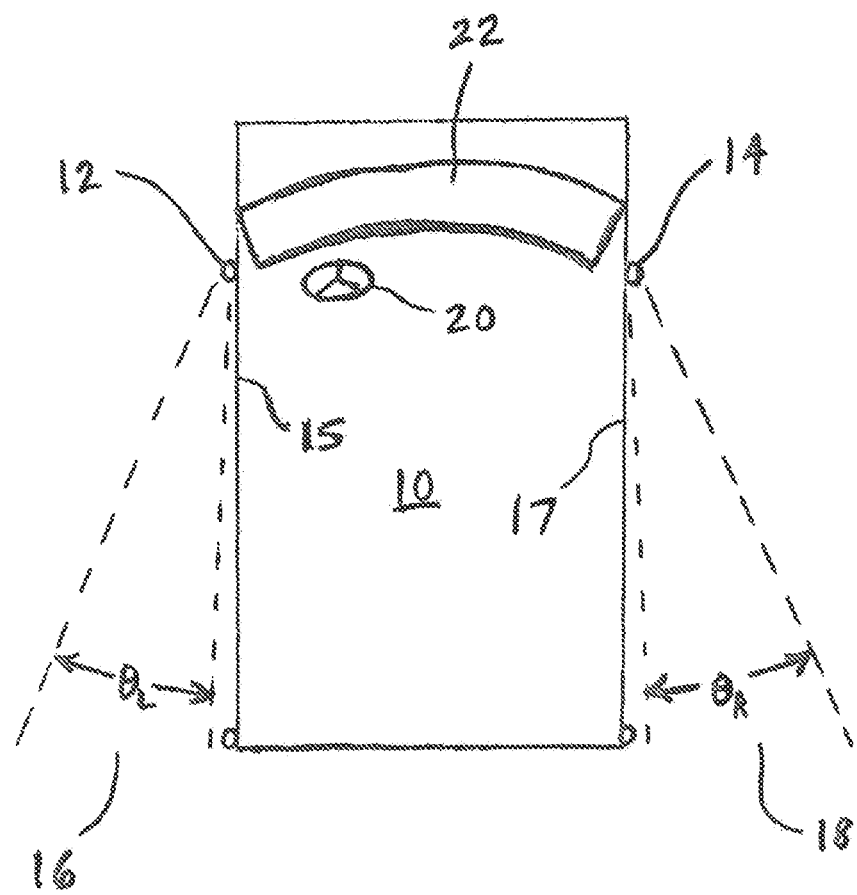
FIG. 1 is a schematic top view of side view cameras disposed on a motor vehicle of the present invention.

FIG. 1 illustrates one embodiment of a motor vehicle 10 of the present invention, including a left side view camera 12 and a right side view camera 14. Each of cameras 12, 14 may be low profile in that they are mounted too low on the body of vehicle 10 for the driver to see through the side windows. Camera 12 may be attached to a left lateral side 15 of a body of motor vehicle 10, and has a conical field of view 16 defining an angle $\theta_L$. Similarly, camera 14 may be attached to a right lateral side 17 of a body of motor vehicle 10, and has a conical field of view 18 defining an angle $\theta_R$. Vehicle 10 also include a steering wheel 20 and windshield 22.

Figure 2:
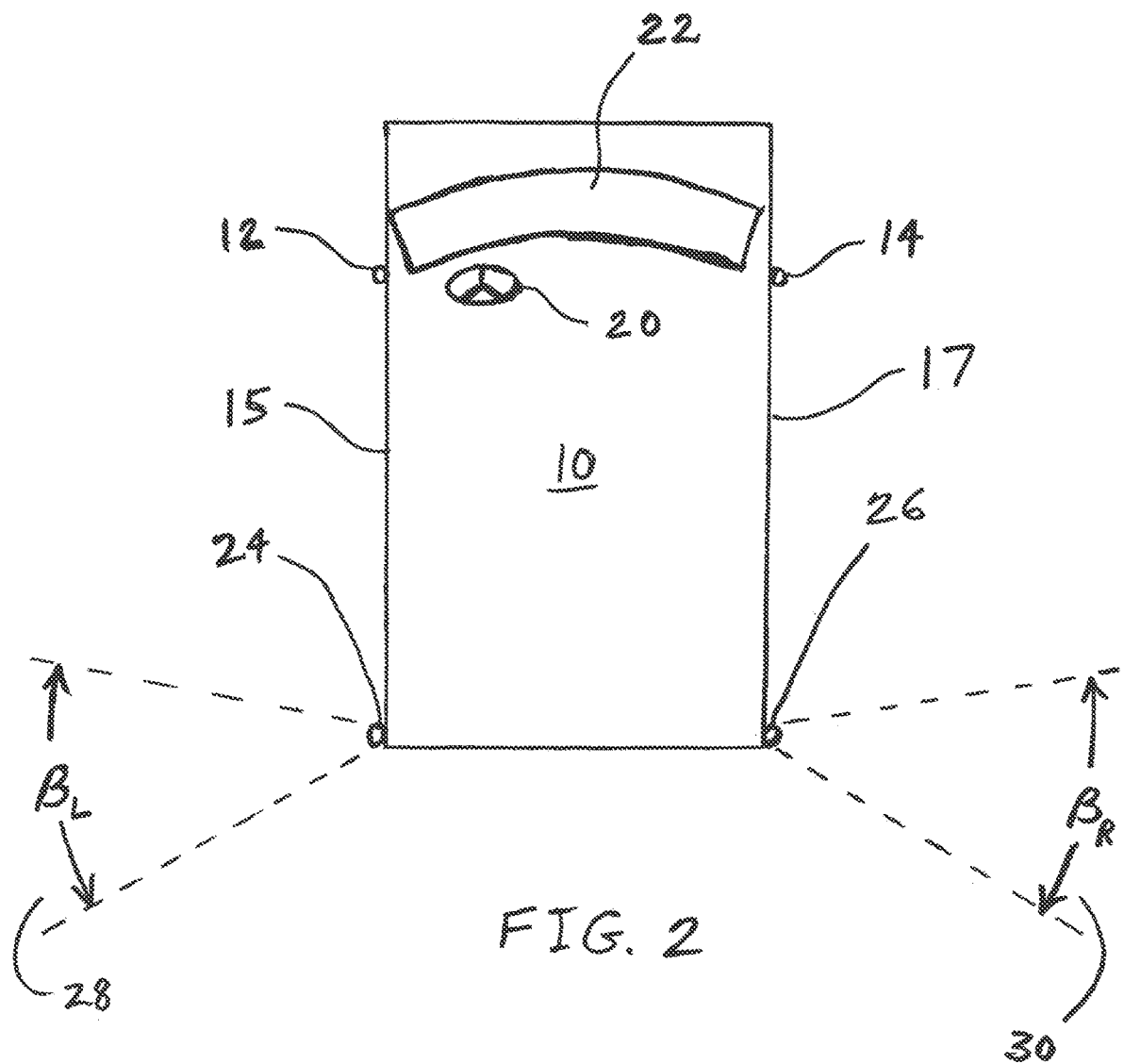
FIG. 2 is a schematic top view of back up cameras disposed on the motor vehicle of FIG. 1.

FIG. 2 illustrates a left side back up camera 24 and a right side back up camera 26 on vehicle 10. Camera 24 has a conical field of view 28 defining an angle $\beta_L$. Similarly, camera 26 has a conical field of view 30 defining an angle $\beta_R$.

Figure 3:
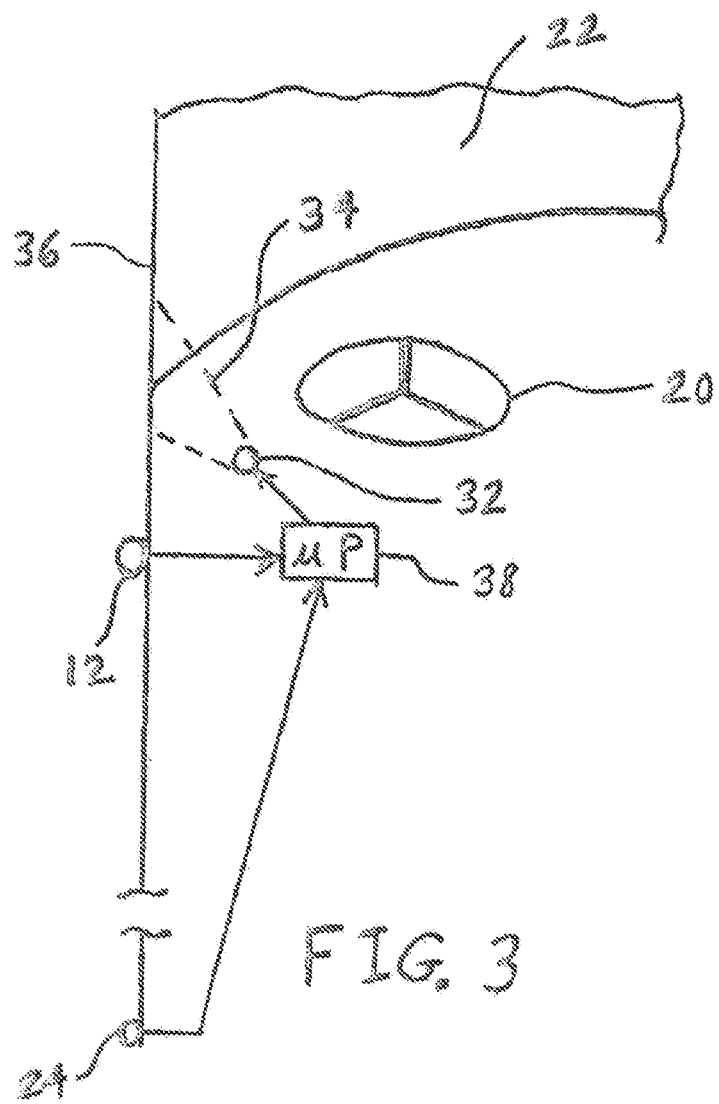
FIG. 3 is a schematic rear view of the driver's side of the passenger compartment of the motor vehicle of FIG. 1.

FIG. 3 illustrates the driver's side of the passenger compartment of motor vehicle 10. A head up display optics module 32 projects a light field 34 onto a driver's side window 36. A human driver sitting behind steering wheel 20, when looking at window 36 sees light field 34 reflected off of window 36 as a virtual image that appears to be disposed some distance outside of and beyond window 36. An electronic processor 38 receives images captured by left side view camera 12 and left side back up camera 24 and transmits an image signal based on the captured images to optics module 32. Optics module 32 produces light field 34 based on the image signal from processor 38. In one embodiment, light field 34 is based on images captured by both left side view camera 12 and back up camera 24 only when vehicle 10 is in the Reverse gear, and light field 34 is based on images captured by only left side view camera 12 when vehicle 10 is not in the Reverse gear.

A HUD system is shown on only the driver's side (i.e., left side) of the passenger compartment of FIG. 3 for clarity of illustration. However, it is to be understood that vehicle 10 includes a substantially similar HUD system on the passenger's side (i.e., right side) of the passenger compartment, and which incorporates the images captured by right side view camera 14 and right side back up camera 26.

Figure 4:
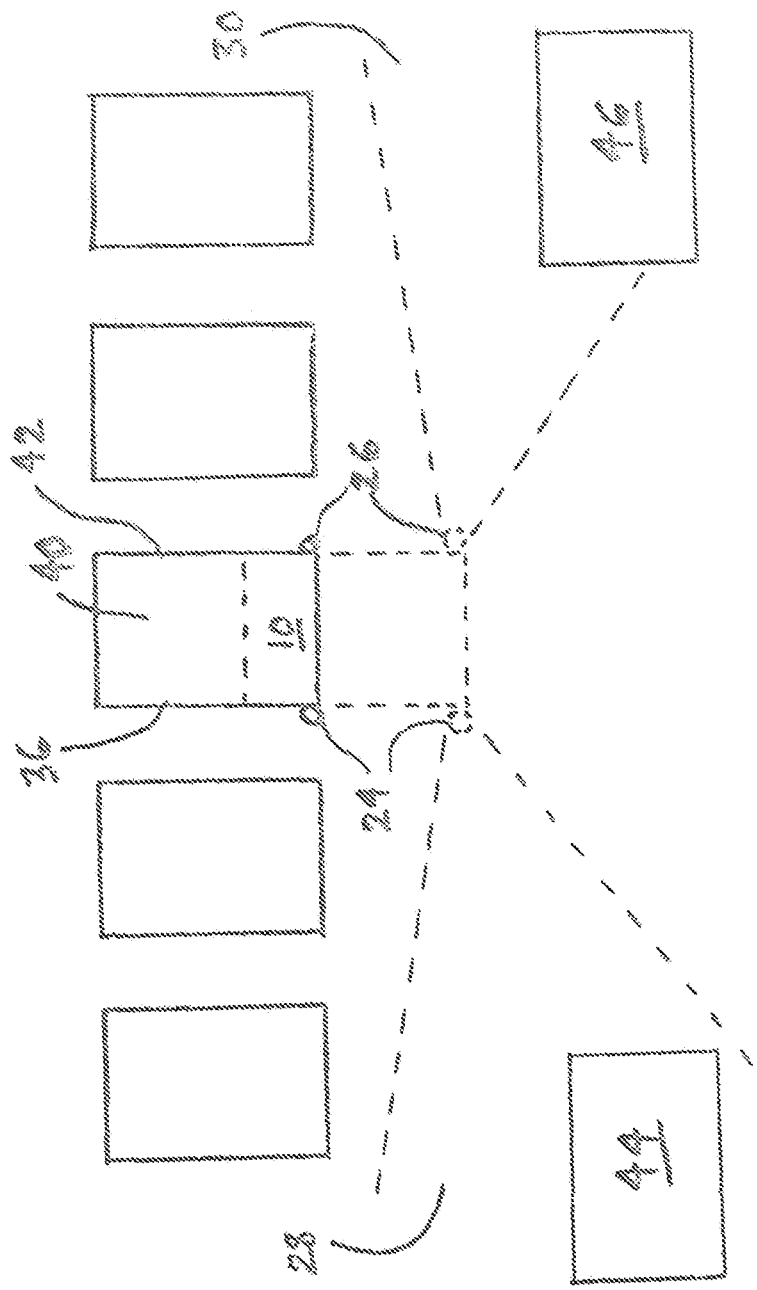
FIG. 4 is a plan view of the vehicle of FIG. 1 backing out of a parking space.

FIG. 4 is a plan view of vehicle 10 backing out of a parking space 40. The position of vehicle 10 as vehicle 10 backs out of parking space 40 in the Reverse gear is indicated by dashed lines. Back up cameras 24, 26 capture images within respective fields of view 28, 30 as vehicle 10 backs up, producing HUD virtual images reflected off of respective side view windows 36, 42. Accordingly, the driver may see oncoming vehicles 44, 46 approaching vehicle 10 within respective fields of view 28, 30 before they vehicles 44, 46 would have been visible to the driver with the naked eye or with conventional side view mirrors.

Figure 5:
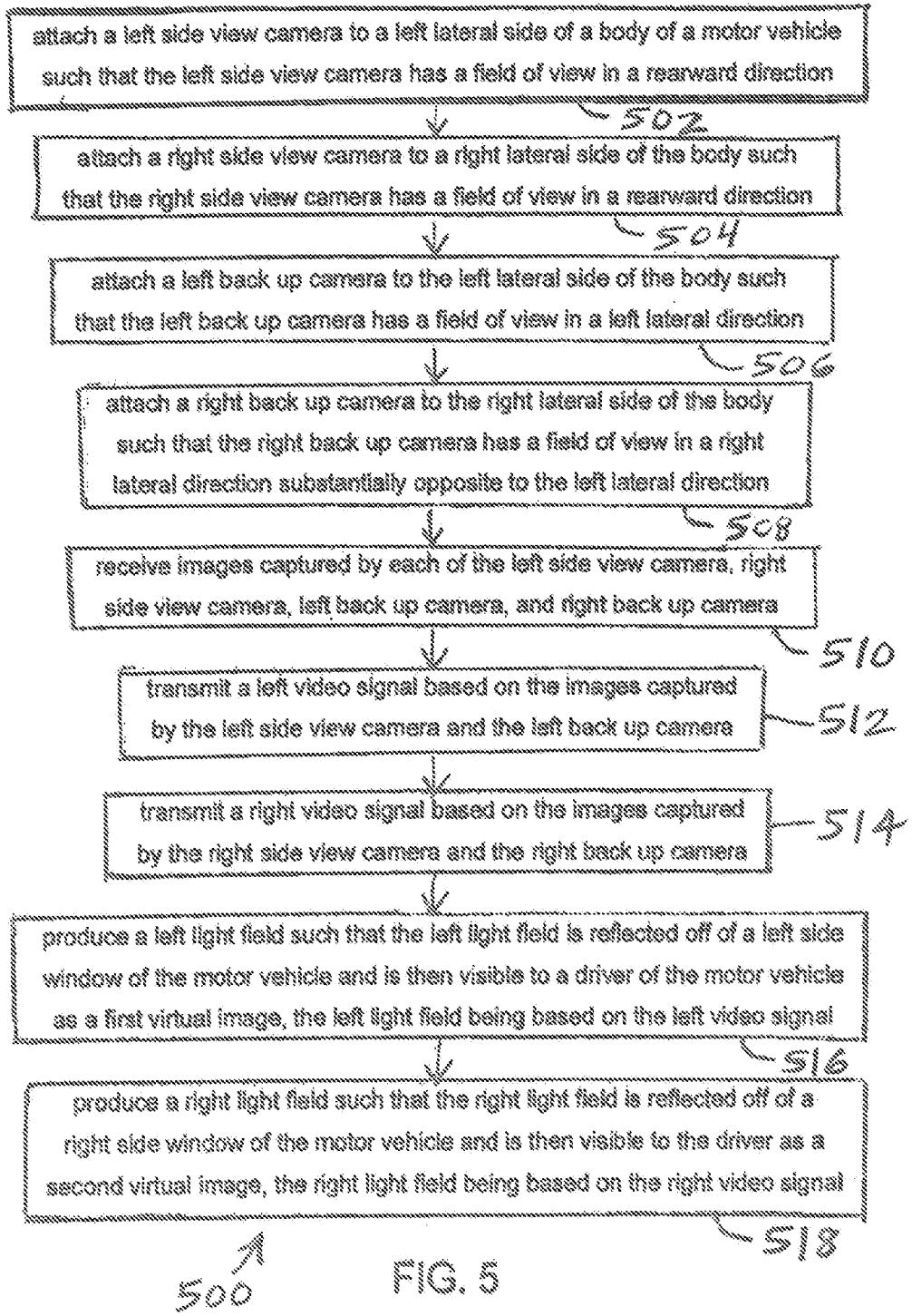
FIG. 5 is a flow chart of one embodiment of a display method of the present invention for a motor vehicle.

FIG. 5 is a flow chart of one embodiment of a display method 500 of the present invention for a motor vehicle. In a first step 502, a left side view camera is attached to a left lateral side of a body of the motor vehicle such that the left side view camera has a field of view in a rearward direction. For example, left side view camera 12 may be attached to a left lateral side 15 of a body of motor vehicle 10 such that left side view camera 12 has a field of view 16 in a rearward direction, as shown in FIG. 1.

Next, in step 504, a right side view camera is attached to a right lateral side of the body such that the right side view camera has a field of view in a rearward direction. For example, right side view camera 14 may be attached to a right lateral side 17 of a body of motor vehicle 10 such that right side view camera 14 has a field of view 18 in a rearward direction, as shown in FIG. 1.

In a next step 506, a left back up camera is attached to the left lateral side of the body such that the left back up camera has a field of view in a left lateral direction. For example, left back up camera 24 may be attached to a left lateral side 15 of a body of motor vehicle 10 such that left back up camera 24 has a field of view 28 in a left lateral direction, as shown in FIG. 2.

In step 508, a right back up camera is attached to the right lateral side of the body such that the right back up camera has a field of view in a right lateral direction substantially opposite to the left lateral direction. For example, right back up camera 26 may be attached to a right lateral side 17 of a body of motor vehicle 10 such that right back up camera 26 has a field of view 30 in a right lateral direction, as shown in FIG. 2.

Next, in step 510, images captured by each of the left side view camera, right side view camera, left back up camera, and right back up camera are received. For example, processor 38 may receive images captured by each of left side view camera 12, right side view camera 14, left back up camera 24, and right back up camera 26.

In a next step 512, a left video signal is transmitted based on the images captured by the left side view camera and the left back up camera. For example, processor 38 may transmit a left video signal to head up display optics module 32 based on the images captured by left side view camera 12 and the left back up camera 24.

In step 514, a right video signal is transmitted based on the images captured by the right side view camera and the right back up camera. For example, processor 38 may transmit a right video signal to head up display optics module 32 based on the images captured by right side view camera 14 and the right back up camera 26.

Next, in step 516, a left light field is produced such that the left light field is reflected off of a left side window of the motor vehicle and is then visible to a driver of the motor vehicle as a first virtual image, the left light field being based on the left video signal. For example, head up display optics module 32 projects a left light field 34 onto a driver's side window 36. A human driver sitting behind steering wheel 20, when looking at window 36 sees light field 34 reflected off of window 36 as a virtual image. Light field 34 may be produced based on the left video signal transmitted by processor 38.

In a final step 518, a right light field is produced such that the right light field is reflected off of a right side window of the motor vehicle and is then visible to the driver as a second virtual image, the right light field being based on the right video signal. For example, head up display optics module 32 projects a right light field, similar to left light field 34, onto a passenger's side window 42. A human driver sitting behind steering wheel 20, when looking at window 42 sees the light field reflected off of window 42 as a virtual image. The light field may be produced based on the right video signal transmitted by processor 38. The invention has been described as projecting a head up display onto a side window. However, in another embodiment the image may be displayed in a video monitor mounted in the dashboard or on the driver's door for the cameras on the driver's side of the vehicle, and the passenger's door for the cameras on the passenger's side of the vehicle. It is also possible for the image to be displayed in a windshield head up display.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A motor vehicle, comprising:
    a body;
    a first camera attached to the body and having a field of view in a rearward direction;
    a second camera attached to the body and having a field of view in a lateral direction;
    an electronic processor configured to:
        receive images captured by each of the first camera and the second camera; and
        transmit a video signal, the video signal being based on the images captured by the second camera only when the vehicle is in a Reverse gear, and is based on the images captured by the first camera when the vehicle is not in the Reverse gear; and
    an optics module configured to receive the video signal from the electronic processor and produce a light field such that the light field is reflected off of a side window of the motor vehicle and is then visible to the driver as a virtual image, the light field being based on the video signal.

2. The motor vehicle of claim 1 wherein the video signal is not based on the images captured by the second camera when the vehicle is not in the Reverse gear.

3. The motor vehicle of claim 1 wherein the side window comprises a first side window, the vehicle further comprising a second side window disposed in a front door of the vehicle, the second side window being movable relative to the front door between an upper closed position and a lower open position.

4. The motor vehicle of claim 1 wherein the first camera and a steering wheel of the vehicle are substantially aligned in a lateral direction that is substantially perpendicular to a forward direction of the vehicle.

5. The motor vehicle of claim 1 wherein the second camera is disposed at a rear end of the motor vehicle.

6. The motor vehicle of claim 1 wherein the first camera has a conical field of view.

7. The motor vehicle of claim 1 wherein the second camera has a conical field of view.

8. A display method for a motor vehicle, the method comprising:
    attaching a first camera to a body of the motor vehicle such that the first camera has a field of view in a rearward direction;
    attaching a second camera to the body such that the second camera has a field of view in a lateral direction;
    receiving images captured by the first camera and the second camera;
    transmitting a video signal, the video signal being based on the images captured by the second camera only when the vehicle is in a Reverse gear, and is based on the images captured by the first camera when the vehicle is not in the Reverse gear; and
    producing a light field such that the light field is reflected off of a side window of the motor vehicle and is then visible to the driver as a virtual image, the light field being based on the video signal.

9. The method of claim 8 wherein the video signal is not based on the images capture by the second camera when the vehicle is not in the Reverse gear.

10. The method of claim 8 wherein the side window comprises a first side window, the method further comprising:
    providing a second side window disposed in a front door of the vehicle; and
    moving the second side window relative to the front door between an upper closed position and a lower open position.

11. The method of claim 8 wherein the first camera and a steering wheel of the vehicle are substantially aligned in a lateral direction that is substantially perpendicular to a forward direction of the vehicle.

12. The method of claim 8 wherein the second camera is disposed at a rear end of the motor vehicle.

13. The method of claim 8 wherein the first camera has a conical field of view.

14. The method of claim 8 wherein the second camera has a conical field of view.

15. A display arrangement for a motor vehicle, the arrangement comprising:
    a first camera configured to be attached to a body of the motor vehicle such that the first camera has a field of view in a rearward direction;

a second camera configured to be attached to the body of the motor vehicle such that the second camera has a field of view in a lateral direction;

an electronic processor configured to:
receive images captured by each of the first camera and the second camera; and
transmit a video signal, the video signal being based on the images captured by the second camera only when the vehicle is in a Reverse gear, and is based on the images captured by the first camera when the vehicle is not in the Reverse gear; and an optics module configured to receive the video signal from the electronic processor and produce a light field such that the light field is reflected off of a side window of the motor vehicle and is then visible to the driver as a virtual image, the light field being based on the video signal.

16. The arrangement of claim 15 wherein the first camera has a conical field of view.

17. The arrangement of claim 15 wherein the second camera has a conical field of view.

18. The arrangement of claim 15 wherein the video signal is based on the images captured by the first camera and the second camera only when the vehicle is in a Reverse gear.

19. The arrangement of claim 15 wherein the video signal is not based on the images captured by the second camera when the vehicle is not in the Reverse gear.

20. The arrangement of claim 15 wherein the second camera is disposed at a rear end of the motor vehicle.

* * * * *